United States Patent [19]

Kraus

[11] Patent Number: 4,526,051
[45] Date of Patent: Jul. 2, 1985

[54] INFINITELY VARIABLE TRACTION ROLLER TRANSMISSION SPEED CONTROL ARRANGEMENT

[75] Inventor: Charles E. Kraus, Austin, Tex.

[73] Assignee: Excelermatic Inc., Austin, Tex.

[21] Appl. No.: 476,814

[22] Filed: Mar. 18, 1983

[51] Int. Cl.³ .............. F16H 15/08; B60K 41/04; B60K 41/06; B60K 41/08
[52] U.S. Cl. ...................... 74/200; 74/867; 74/868
[58] Field of Search ............... 74/200, 199, 201, 867, 74/868

[56] References Cited

U.S. PATENT DOCUMENTS

| | | | |
|---|---|---|---|
| 3,184,990 | 5/1965 | Perry | 74/867 |
| 4,091,690 | 5/1978 | Miyao | 74/868 |
| 4,270,415 | 6/1981 | Dickinson et al. | 74/867 |
| 4,275,610 | 6/1981 | Kraus | 74/200 |
| 4,297,918 | 11/1981 | Perry | 74/867 |
| 4,434,675 | 3/1984 | Kraus | 74/200 |
| 4,444,068 | 4/1984 | Kraus | 74/200 |

FOREIGN PATENT DOCUMENTS

| | | | |
|---|---|---|---|
| 2107009 | 4/1983 | United Kingdom | 74/200 |
| 2108600 | 5/1983 | United Kingdom | 74/200 |

Primary Examiner—Lawrence Staab
Assistant Examiner—Michael D. Bednarek
Attorney, Agent, or Firm—Klaus J. Bach

[57] ABSTRACT

In a speed control arrangement for an infinitely variable traction roller transmission in which motion transmitting traction rollers supported by pivot trunnions are disposed between, and in engagement with, toric discs for the transmission of motion therebetween, the trunnions have hydraulic piston and cylinder structures at opposite axial ends whose operating pressures are controlled by the control arrangement for proper torque and speed change characteristics. A torque control valve adapted to control fluid flow from a pressurized fluid source to the cylinders at opposite ends of said trunnions provides for a fluid pressure differential thereby generating an axial trunnion force corresponding to a desired torque through the transmission. Any force imbalance axially moving the trunnions is adapted to change the transmission ratio so as to obtain the desired torque level.

15 Claims, 5 Drawing Figures

INFINITELY VARIABLE TRACTION ROLLER TRANSMISSION SPEED CONTROL ARRANGEMENT

BACKGROUND OF THE INVENTION

The invention relates to an infinitely variable traction roller transmission speed control arrangement especially for use in automobiles.

For the performance of an automobile, control of engine and vehicle speed is not the only consideration. Even more important is the control of torque available at the driving wheels since this is what accounts for the vehicle's acceleration. In most internal combustion engines, the engine torque increases slightly with engine speed to about 2000–3000 rpm and then drops again while engine output however still increases. For maximum torque at the driving wheels, the engine should therefore be operated near top power output at which point however engine losses and fuel consumption are relatively high. For best fuel consumption the engine should be operated at relatively low speed and open throttle under which condition reserve torque at the driving wheels is relatively low.

An infinitely variable transmission theoretically permits the selection of any desirable operating condition. For an automobile this requires however a relatively inexpensive and reliable control arrangement which, in a transmission with hydrostatic thrust bearings and hydraulic transmission ratio control, is preferably of a hydraulic nature since pressurized hydraulic fluid is readily available in such a transmission.

SUMMARY OF THE INVENTION

In order to provide a relatively simple, purely hydraulic control arrangement for an infinitely variable traction roller transmission in which motion-transmitting traction rollers are supported by pivot trunnions between, and in engagement with, toric discs, the trunnions have hydraulic piston and cylinder structures at opposite axial ends thereof adapted to apply axial trunnion forces for balancing torque reaction forces of the traction rollers and for axially moving the trunnions in order to change the transmission ratio. The pressures in the cylinders at opposite trunnion ends are controlled by an accelerator operated torque profile control valve which controls fluid flow from a pressurized fluid source to the cylinders at the opposite trunnion ends so as to provide a pressure differential corresponding to a desired torque. Any force imbalance between the hydraulic control forces and the torque reaction forces causes axial movement of the trunnions providing for change of the transmission ratio to restore the desired torque level. Preferably, means are provided to modify the pressure differential when engine braking of a vehicle including such a transmission is desired to avoid a transmission ratio change to greater transmission output speed.

This control arrangement cannot only maintain a selected engine torque but it can alter the torque profile as a function of engine speed to match the engine's minimum basic fuel consumption curve, for example. The control arrangement operates by varying the control fluid pressure on the traction roller pivot trunnions to match any desired torque curve as a function of transmission ratio and it allows for good control of engine braking during vehicle deceleration. Furthermore, at engine idle, the transmission ratio is returned to full ratio reduction.

If desired, a control feature can be provided which permits the driver to select any performance level between maximum performance and maximum fuel economy.

SHORT DESCRIPTION OF THE DRAWINGS

DESCRIPTION OF THE PREFERRED EMBODIMENT

Figure 1:
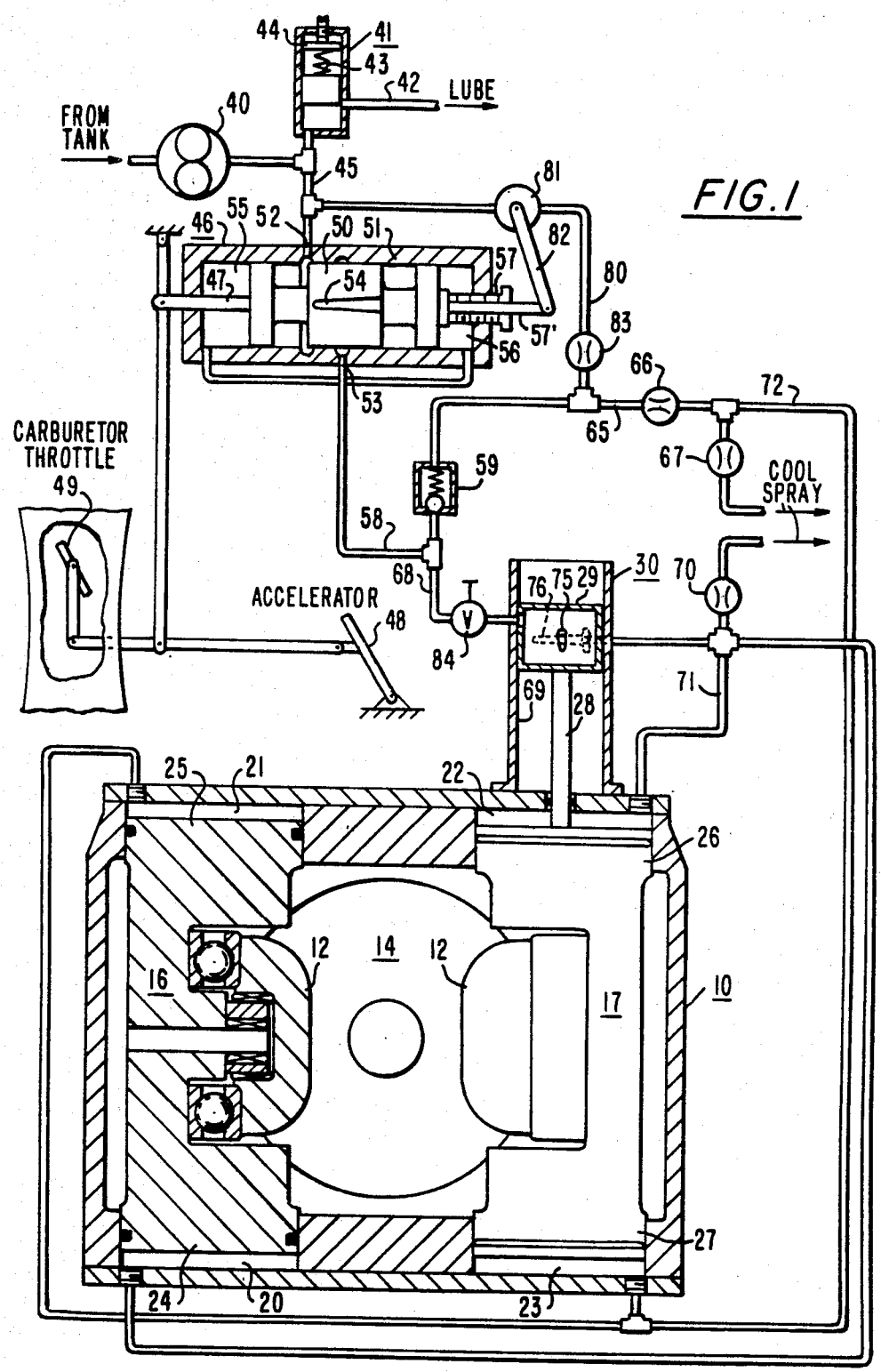
FIG. 1 is a cross-sectional view of a traction roller transmission of the type with which the present invention may be used and also shows schematically the general control arrangement according to the invention.

For the description of details of a traction roller transmission of the type to which the present invention relates, reference is made to the present inventors' co-pending application Ser. No. 455,121, filed Jan. 26, 1983.

Principally, such a transmission consists of a housing 10 in which traction rollers 12 are disposed between, and in engagement with, toroidal discs 14 with which the traction rollers 12 are forced into firm engagement with a force depending on the torque transmitted through the transmission. The traction rollers 12 are supported by roller support trunnions 16, 17 which are pivotally mounted for the adjustment of different transmission ratios. At their opposite ends, the support trunnions 16, 17 have pistons 24, 25, 26, 27 and the housing 10 has cylindrical cavities 20, 21, 22, 23 recieving the pistons 24, 25, 26, 27. Pressurized lubricant may be admitted to the cylinders 20, 21, 22, 23 to provide for axial precess movement of the trunnions 16, 17.

Any axial precess movement of the trunnions 16, 17 which moves the associated traction rollers out of their neutral positions will cause the traction rollers 12 to walk to smaller circles of contact with one and to larger circles of contact with the other of the toroidal discs 14, thereby changing the ratio of motion transmission between the toroidal discs 14.

One of the trunnions 16, 17, as shown in FIG. 1 trunnion 17, has a rod 28 axially projecting therefrom which rod 28 is the stem of the control piston 29 of a transmission ratio control valve 30 adapted to admit pressurized fluid to cylinders 20 and 22 so as to establish a pressure differential at opposite ends of a trunnion depending on the angular position of the trunnion, that is, on the transmission ratio, as will be described later.

FIG. 1 also shows schematically the hydraulic control system for controlling transmission ratio changes of the infinitely variable traction roller transmission. Lubricant from the transmission sump or a tank is pressurized by a pump 40 driven by an engine associated with the transmission or by an independent power source. The pressure of the lubricant supplied to the system is controlled by an adjustable pressure control valve 41 whose discharge line 42 is connected to lubricant consumption points, particularly, the transmission's hydraulic bearings. The pump 40 is selected so as to be capable of always supplying more lubricant than needed in the transmission ratio control system. The pressure control valve is adjustable by adjustment of the force of spring 43 to maintain in the system a maximum pressure corresponding to a maximum desired torque on the engine associated with the transmission. The desired maximum torque may be selected for maximum power or, for example, for maximum fuel efficiency, and may be adjustable by operating means located, for example, at the dashboard of an automobile in which a power train including such infinitely variable transmission is installed. An increase in spring force results in increased system pressure and increased torque demand of the engine which will generally increase fuel economy but reduce available excess power whereas a decrease in spring force will provide for reduced lubricant pressure in the control system so as to reduce the load on the engine to make more power readily available for fast acceleration of the engine and the vehicle. A temperature sensitive mechanism such as a bimetallic spring support disc 44 may be provided which automatically reduces the spring force when the engine is still cold so as to reduce engine load during engine warm-up.

The pressurized fluid from the lubricant pump 40 with a pressure as adjusted by the pressure control valve 41 is applied through fluid line 45 to a torque profile control valve 46 having an operating stem 47 operatively connected to an accelerator pedal 48 which is also connected to the control mechanism for an engine fuel supply device such as the throttle valve 49 of a carburetor. The profile control valve 46 has a spindle 50 movably disposed in a cylinder 51 provided with an inlet 52 and an outlet 53. The spindle 50 has formed therein a groove 54 of varying cross-section which permits lubricant flow from the inlet 52 to the outlet 53 depending on the axial position of the spindle 50 within the cylinder 51, that is, depending on the position of accelerator pedal 48 and the position of the throttle valve 49. Lubricant filled spindle cavities 55 and 56 are provided at opposite axial ends of the spindle 50 to avoid the generation of axial forces on the spindle 50. An adjustment screw 57 at one end of the cylinder limits spindle travel during engine braking when the torque transmitted through the transmission is reversed in direction.

Figure 2:
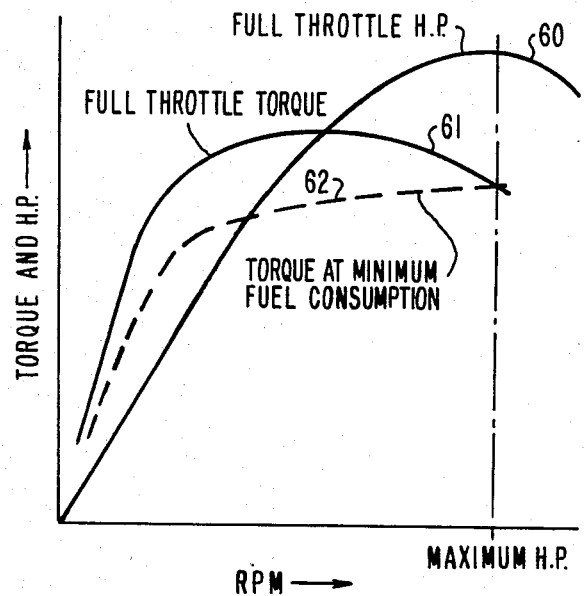
FIG. 2 shows typical maximum power and torque curves of an internal combustion engine.

The amount of fluid permitted to pass through the valve 46 for control of the transmission ratio depends to a large extent on the accelerator position and on the shape of the groove 54 in the valve spindle 50. The groove 54 is shaped to accommodate a particular engine. FIG. 2 shows torque and maximum power depending on engine RPM of a typical automotive IC engine. Curve 60 indicates open-throttle power output, curve 61 indicates openthrottle engine torque and curve 62 indicates engine torque at a throttle opening for minimum fuel consumption. Generally, lowest fuel consumption is not at fully open throttle since, at full throttle, there is usually a somewhat richer mixture supplied to the engine than at part throttle in order to permit the engine to supply full power when needed. The shape of curve 62 therefore depends greatly on engine configuration and on the carburation system used. With modern electronically controlled fuel injection systems curve 62 may closely approach curve 61; in any case however, at maximum horsepower RPM, minimum fuel consumption torque, curve 62 will reach open throttle torque curve 61 since, at this point, the engine throttle valve will be fully opened.

In most engines with carburetors, engine torque for minimum fuel consumption increases with engine speed at a reasonably even rate as indicated by curve 62 of FIG. 2. A valve providing a flow rate corresponding to the shape of curve 62 can easily be generated by a valve having an essentially V-shaped groove 54 which provides for a flow cross-section change which is essentially linear with accelerator movement. During engine idle position of the valve 46, which is in the position shown in the drawing, that is, with little overlap of groove 54 and inlet 52, only a small amount of fluid is permitted to pass through valve 46 into control line 58 and since such small amount is permitted to flow through check valve 59, backup cylinder supply line 65 and backup orifice 66 through drain orifice 67 or through input line 68, control valve 30 and drain orifice 70 without any appreciable resistance, there will be no appreciable pressure differential between the supply lines 71 and 72, that is, between the associated cylinders 20, 22 and 21, 23, respectively. Upon opening of valve 46 by actuation of the accelerator, however, fluid pressure to the ratio control valve 30 will rapidly build up as the amount of fluid permitted to flow through the backup orifice 66 is limited by the size of the orifice 66. The pressurized fluid is permitted to flow from line 68 through the control valve 30, thereby generating a pressure differential between cylinders 20 and 21 and between cylinders 22 and 23, causing the trunnions 16 and 17 to move in opposite directions for initiating an "upgrading" in the transmission ratio, that is, for changing the transmission ratio to a higher output speed. At the same time, however, the engine output and the torque transmitted through the transmission are increased. The torque reaction forces on the traction rollers 12 and the trunnions 16 and 17 are in opposition to the hydraulic forces applied to the trunnions by the pressure differentials in the cylinders at opposite ends of the trunnions 16, 17 and balance the hydraulic pressure differential forces. If the hydraulic pressure differential forces are larger than the torque reaction forces on the trunnions, the trunnions are moved axially, thereby initiating a transmission ratio change for greater transmission output speed, that is, an upgrading of the transmission ratio until the torque has increased to balance the increased pressure differential. Reduction of the hydraulic pressure differential on the other hand will permit the torque reaction forces to move the trunnions in the opposite direction thereby initiating a transmission ratio change for lower transmission output speed, that is, downgrading the transmission ratio.

The torque to which the transmission adjusts itself depends on the pressure differential generated by the hydraulic fluid in the cylinders at opposite ends of the trunnions and, given predetermined orifice sizes, the pressure differential depends on the amount of fluid supplied through the torque profile control valve 46. As explained earlier, the flow of fluid through the control valve is dependent on accelerator position and the shape of the valve opening 54. The valve is so adjusted as to be in a desired relationship to the power provided by an associated engine which power depends on the position of the engine throttle valve 49, both being controlled by the accelerator 48. Full opening of valve 46 (and throttle 49) will generate maximum flow through valve 46, which flow however depends on the hydraulic fluid supply pressure as determined by fluid pressure control valve 41. Pressure control valve 41 therefore determines the maximum torque that can be transmitted through the transmission which maximum torque can be adjusted by adjustment of valve 41.

The purpose of the ratio control valve 30 is to further limit the torque and the rate of ratio change in the transmission, and to limit the transmission ratios. FIG. 1 shows the orifice arrangement in ratio control valve 30. Axial orifice 75 is, for example, formed in the valve piston 29 whereas circumferential orifice 76 is formed in the valve cylinder housing 69. When the piston 29, which is connected to the trunnion 17 by stem 28, is moved excessively in axial direction, fluid flow through the valve 30 is cut, thereby limiting axial movement of the trunnion and, as a result, the speed of a change of the transmission ratio. Piston 29 also rotates with pivotal movement of the trunnions until up to the end of overlap of the circumferential orifice 76 with orifice 75. At this point fluid flow is again cut off, thereby limiting pivotal movement of the trunnions to a predetermined maximum value, that is, to predetermined transmission ratios.

Circumferential orifice 76 is slightly V-shaped to provide for a control fluid pressure differential in the cylinders at opposite ends of each trunnion which depends on the angular pivot position of the trunnions. Such a variation is desirable since the pressure differential necessary for maintaining a predetermined torque is different for different trunnion pivot positions.

Figure 3:
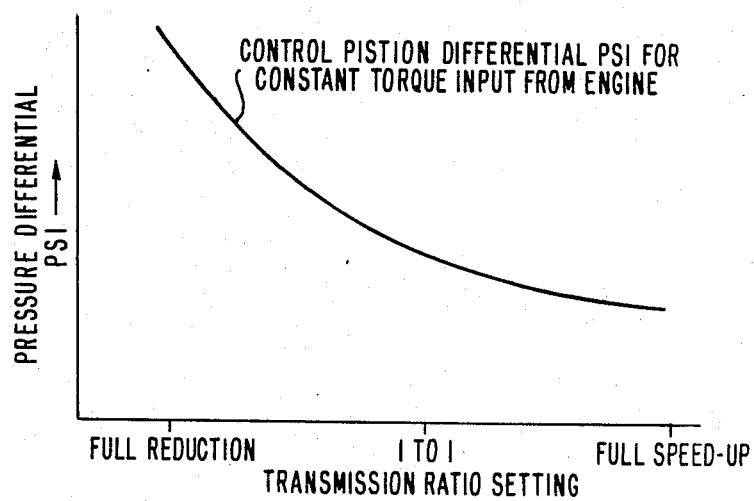
FIG. 3 shows the pressure differential across the trunnions for constant torque depending on the transmission ratio setting.

FIG. 3 indicates, depending on the transmission ratio, the pressure differential required for transmitting a predetermined torque. It is seen that, at full reduction, a substantially greater pressure differential is needed than at full speed up transmission ratio setting. This is a characteristic of the traction roller transmission with which the present invention is concerned since, at a given engine torque, the forces applied by the input toric disc to the traction rollers are much larger when the traction rollers are in contact with an inner surface circle of the input toric disc, that is, at reduction setting, than when the traction rollers are in contact with an outer surface circle of the input toric disc, that is, at high output speed setting.

The V-shaped circumferential orifice 76 is so selected as to generate a pressure differential across the trunnions which approximates the curve as given in FIG. 3.

In order to prevent transmission upgrading (upshifting) when engine braking is needed, the backup piston supply line 65 is connected to the lubricant supply line 45 by means of a connecting line 80 which includes a valve 81 which is operatively connected to the accelerator mechanism so as to open when the accelerator is fully released. For example, a pin 57' may be movably disposed in screw 57 and connected to a valve lever 82 and extend into the valve 46 so as to be engaged by the spindle 50 for moving the lever 82 into a valve opening position when the spindle 50 returns to its idle position. However, it may be pointed out that valve 81 could be fully incorporated in valve 46. In any case, when the engine is expected to brake, that is, the accelerator is released, high pressure lubricant is admitted to the backup piston supply line 65 through an engine brake orifice 83 also disposed in connecting line 80. Check valve 59 will then close as the pressure in the backup cylinder system becomes larger than in the control cylinder system so as to be capable to counteract the axial trunnion forces whose directions are reversed with the reversal of torque transmitted through the transmission. The amount of engine braking is adjustable by adjustment of the spindle stop member 57 with which the end position of the spindle can be determined by controlling the minimum flow of pressurized fluid to the transmission ratio control valve 30.

In summary, the valve 41 determines the maximum fluid pressure in the system and therefore controls the maximum, unmodified torque demandable from the engine with which such a transmission is associated. Valve 46 decreases the fluid pressure in accordance with throttle 49 opening of the engine, thereby establishing a modified control fluid pressure. As the transmission torque determining pressure differential between the cylinders 20, 21 and 22, 23 depends on the level of the modified control fluid pressure, the torque required from the engine by the transmission is basically controlled by the accelerator position. However, ratio control valve 30 modifies the pressure differential between the cylinders at opposite ends of the trunnions dependent on the trunnion pivot position so as to provide a constant torque load on the engine essentially proportional to the pressure of the fluid as controlled by valve 46. During engine braking when valve 46 is essentially closed and valve 81 is opened, the pressure established in the backup cylinders 21 and 23 is higher than in the control cylinders 20, 22 to permit the transmission of a reverse torque, the level of which is determined by adjustment of the engine braking orifice 83.

In some cases, such as with electric vehicles, it is possible to reverse the motor for reverse driving. For short operation this is possible simply by opening brake valve 81 or closing a reverse valve 84 to limit hydraulic fluid flow to the control cylinders 20 and 22 and establishing increased pressure in the backup cylinders 21 and 23 in order to maintain the transmission ratio at a high value.

Figure 4:
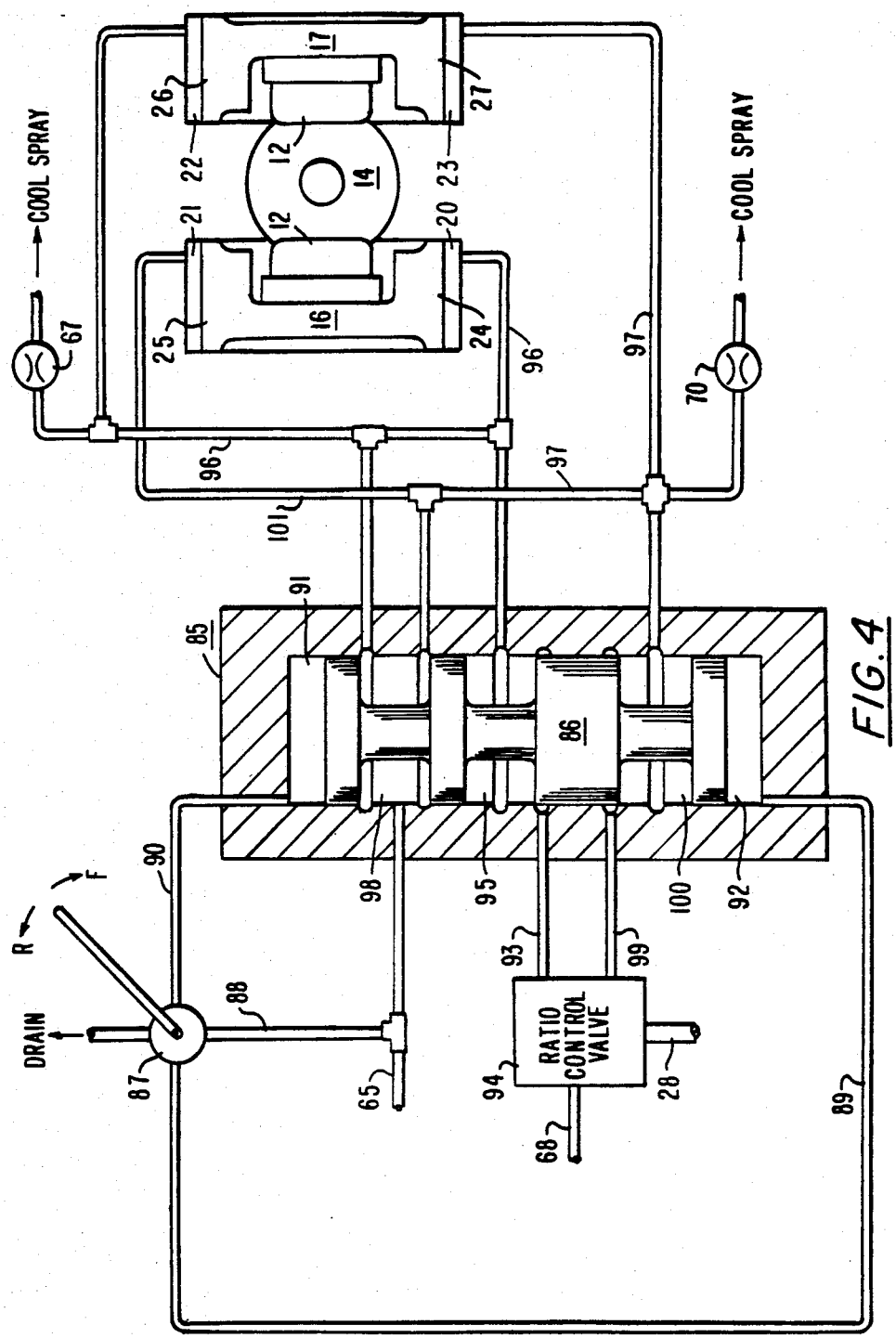
FIG. 4 shows schematically a portion of the control arrangement adapted for forward and reverse operation including a six-way valve as used in the arrangement of FIG. 3.

If, however, it is desired to control the transmission during reverse operation, it is necessary to convert control cylinder to backup cylinder and backup cylinder to control cylinder operation. Then there may be provided a six-way valve 85 as shown in FIG. 4 which is adapted to reverse the functions of the backup and control cylinders. As shown, the valve 85 has a spindle 86 which is hydraulically movable between forward and reverse operating positions by a valve 87 and hydraulic lines 88, 89, 90 adapted to selectively supply pressurized hydraulic fluid to chambers 91 and 92 at opposite ends of the spindle 86. For forward operation, hydraulic fluid is admitted to chamber 91 so that the spindle 86, moved downwardly, provides for communication from forward line 93 of the ratio control valve 94 through spindle chamber 95 and line 96 to cylinders 20 and 22 while cylinders 21 and 23 are in communication with backup line 65 through line 97 and spindle chamber 98. For reverse operation, hydraulic fluid is admitted by valve 87 to valve chamber 92 so that the spindle 86 moved upwardly provides for communication from reverse line 99 through spindle chamber 100 to cylinders 21 and 23 while the cylinders 20 and 22 are in communication with backup line 65 through line 96 and spindle chamber 98.

Figure 5:
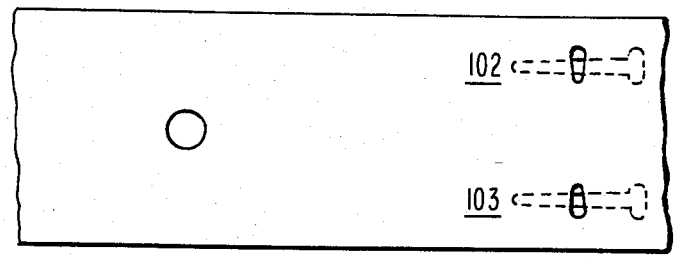
FIG. 5 shows developed the surface of a ratio control valve for forward and reverse service.

The torque control fluid pressure is taken from two different lines 93 and 99 since the ratio control orifices need to be shaped differently for forward and reverse operations. The valve 94 has two separate spaced orifice structures 102 and 103 oriented as shown in FIG. 5 in view of the reversed trunnion forces upon reversal of the torque through the transmission.

The present invention provides for a hydraulic control arrangement for an infinitely variable transmission which is relatively simple and inexpensive as it requires only a few inexpensive control valves and some flow control orifices. There is no need to employ engine vacuum. This is advantageous since emission control equipment in new cars causes deterioration of engine vacuum to such an extent that it is not a reliable source for determining engine operating conditions. Furthermore, some engines, such as diesel engines, are designed so as to provide only little intake manifold vacuum, and electric motors with no natural vacuum source altogether.

The invention however is not limited to the specific arrangement described. It is, for example, possible to control a transmission by providing hydraulic pressure only to a control cylinder at one end of each trunnion while a spring is disposed at its opposite end. Axial trunnion forces would then be balanced by controlling the fluid pressure in the control cylinders only. Engine braking would then be achievable by shutting off the fluid supply to the control cylinders.

I claim:

1. A speed control arrangement for an infinitely variable traction roller transmission comprising a housing, coaxial input and output toric traction roller discs rotatably supported in said housing, said toric discs having toric traction surfaces arranged opposite each other so as to define therebetween a toric cavity of circular cross-section; at least two motion transmitting traction rollers arranged in radial symmetry between, and in engagement with, said toric discs for the transmission of motion therebetween; pivotal support trunnions rotatably supporting said traction rollers between said toric discs and being supported in said housing pivotally about an axis which is essentially tangential to the center circle of said toric cavity so as to permit changing of the ratio of motion transmission between said input and output toric discs, said trunnions being further axially movable and having pistons arranged at one of their ends and disposed in cylinders adapted to be selectively pressurized for axially moving the trunnions to initiate a change of the transmission ratio and to establish axial trunnion forces in opposition to torque reaction forces applied to the traction rollers when a torque is transmitted through the transmission, said speed control arrangement including a pressurized fluid source; a torque control valve operable by an accelerator and adapted to control fluid flow from said fluid source into a control fluid line connected to the control cylinders at one end of each trunnion to establish a control fluid pressure depending on the position of the torque control valve, a backup fluid line connected to said control fluid line and the backup cylinders at the opposite ends of said trunnions and including a backup orifice, said backup control fluid line including a drain orifice so as to provide, in cooperation with said backup orifice, for backup fluid pressure in said backup cylinders which is lower than in said control cylinders thereby establishing a pressure differential between said control and backup cylinders which depends on said control fluid pressure.

2. A speed control arrangement as claimed in claim 1, wherein said control pressure line includes a ratio control valve associated with one of said trunnions and having flow control openings which are variable depending on the pivot position of said trunnion and wherein a drain orifice is disposed in the control fluid line from said flow control valve so as to provide for modification of the control fluid pressure applied to said control cylinders depending on the pivot position of said trunnions.

3. A speed control arrangement as claimed in claim 2, wherein said transmission is associated with an engine, said backup fluid line has a branch bypassing said torque control valve and including a normally closed brake valve adapted to be opened when engine braking is desired and a check valve is arranged in the backup line connection to said control line to prevent pressurized fluid from entering said control line when said brake valve is opened.

4. A speed control arrangement as claimed in claim 3, wherein said branch line also includes a brake orifice for controlling the fluid pressure in said backup line when said brake valve is opened.

5. A speed control arrangement as claimed in claim 1, wherein the fluid supply line to said torque control valve includes an adjustable pressure control valve for controlling the pressure of the supply line fluid determining the maximum torque transmitted through said transmission.

6. A speed control arrangement as claimed in claim 1, wherein said accelerator is also associated with a power output control means of a motor coupled to said transmission.

7. A speed control arrangement as claimed in claim 4, wherein said engine brake valve is operatively connected to said accelerator in such a manner as to be closed whenever the accelerator is actuated.

8. A speed control arrangement as claimed in claim 3, wherein said torque profile control valve is a spindle valve operated by said accelerator, the spindle of said valve having a V-shaped flow control groove providing for a flow orifice of a cross-section which increases with movement of the accelerator to a higher output of said engine so as to provide a control fluid pressure which increases with the engine power output setting of said accelerator.

9. A speed control arrangement as claimed in claim 2, wherein said ratio control valve includes a piston disposed in a cylinder and mounted on a stem connected to a trunnion for pivotal and axial movement therewith and said flow control opening includes an axial slot of varying cross-section in one of said cylinder and said piston and a circumferential slot of varying cross-section formed in the other of said cylinder and said piston so as to be in a generally intersecting relation, said axial and circumferential slots being so shaped and arranged that their common flow cross-section decreases when the trunnion pivots toward a greater output speed ratio in order to maintain a constant torque and also with an axial movement of the piston in order to limit the speed of a transmission ratio change.

10. A control arrangement as claimed in claim 9, wherein two sets of slots are provided in said piston and cylinder, a first for forward and a second for reverse speed control operation and wherein valve means are provided for selectively changing over the flow control provided through the first of said sets of slots to said control cylinder to a flow control through said second set to said backup cylinder while connecting said control cylinders to said backup cylinder supply line.

11. A speed control arrangement for an infinitely variable traction roller transmission comprising a housing, coaxial input and output toric traction roller discs rotatably supported in said housing, said toric discs having toric traction surfaces arranged opposite each other so as to define therebetween a toric cavity of circular cross-section; at least two motion transmitting traction rollers arranged in radial symmetry between, and in engagement with, said toric discs for the transmission of motion therebetween; pivotal support trunnions rotatably supporting said traction rollers between said toric discs and being supported in said housing pivotally about an axis which is essentially tangential to the center circle of said toric cavity so as to permit changing of the ratio of motion transmission between said input and output toric discs, said trunnions being further axially movable and having biasing means arranged at one of their ends and pistons disposed in cylinders at their other ends, said cylinders being adapted to be pressurized for axially moving the trunnions against said biasing means to initiate a change of the transmission ratio and to establish predetermined axial trunnion forces in opposition to torque reaction forces applied to the traction rollers when a torque is transmitted through the transmission, said speed control arrangement including a pressurized fluid source; a torque control valve operable by an accelerator and adapted to control fluid flow from said fluid source into a control fluid line connected to the cylinders at one end of each trunnion, said control fluid line having a drain orifice so as to establish a control fluid pressure depending on the position of the torque control valve, and a ratio control valve associated with one of said trunnions and having flow control openings having a flow cross-section depending on the pivot position of said trunnions so as to provide for modification of the control fluid pressure admitted to said control cylinders depending on the pivot position of said trunnions.

12. A speed control arrangement as claimed in claim 11, wherein said control fluid line includes a shut-off valve adapted to be closed when said accelerator is in idle position and downgrading of said transmission in response to a torque reversal is to be prevented.

13. A speed control arrangement as claimed in claim 12, wherein the fluid supply line to said torque control valve includes an adjustable pressure control valve for controlling the pressure of the supply line fluid determining the maximum torque transmitted through said transmission.

14. A speed control arrangement as claimed in claim 13, wherein said torque profile control valve is a spindle valve operated by said accelerator, the spindle of said valve having a V-shaped flow control groove providing for a flow orifice of a cross-section which increases with movement of the accelerator to a higher output of said engine so as to provide a control fluid pressure which increases with the engine power output setting of said accelerator.

15. A speed control arrangement as claimed in claim 14, wherein said ratio control valve includes a piston disposed in a cylinder and mounted on a stem connected to a trunnion for pivotal and axial movement therewith and said flow control opening includes an axial slot of varying cross-section in one of said cylinder and said piston and a circumferential slot of varying cross-section formed in the other of said cylinder and said piston so as to be in a generally intersecting relation, said axial and circumferential slots being so shaped and arranged that their common flow cross-section decreases when the trunnion pivots toward a greater output speed ratio in order to maintain a constant torque and also with an axial movement of the piston in order to limit the speed of a transmission ratio change.

* * * * *